(12) United States Patent
Hirayama et al.

(10) Patent No.: US 7,850,110 B2
(45) Date of Patent: Dec. 14, 2010

(54) DRAG ADJUSTING DEVICE FOR DUAL-BEARING REEL

(75) Inventors: Hirokazu Hirayama, Sakai (JP); Hiroaki Kuriyama, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 12/558,583

(22) Filed: Sep. 14, 2009

(65) Prior Publication Data

US 2010/0084499 A1  Apr. 8, 2010

(30) Foreign Application Priority Data

Oct. 7, 2008  (JP) .............................. 2008-260238

(51) Int. Cl.
 *A01K 89/01*  (2006.01)
(52) U.S. Cl. ...................... 242/304; 242/266
(58) Field of Classification Search ................ 242/245, 242/265, 266, 291, 302, 303, 304
See application file for complete search history.

(56) References Cited

U.S. PATENT DOCUMENTS

| | | | | |
|---|---|---|---|---|
| 3,425,644 A | * | 2/1969 | Griste | 242/270 |
| 3,478,979 A | * | 11/1969 | Henze | 242/270 |
| 4,516,741 A | * | 5/1985 | Hashimoto | 242/270 |
| 6,578,785 B1 | | 6/2003 | Hong | |
| 7,234,661 B2 | * | 6/2007 | Hirayama et al. | 242/303 |
| 7,661,618 B2 | * | 2/2010 | Takechi | 242/303 |
| 2006/0016924 A1 | | 1/2006 | Hirayama et al. | |
| 2007/0200023 A1 | | 8/2007 | Konishi | |

FOREIGN PATENT DOCUMENTS

| | | |
|---|---|---|
| GB | 1200122 A | 7/1970 |
| GB | 2206022 A | 12/1988 |
| JP | 2004-173592 A | 6/2004 |

OTHER PUBLICATIONS

The extended European Search Report of corresponding European Application No. 09170021.1, dated Jan. 28, 2010.

* cited by examiner

*Primary Examiner*—Emmanuel M Marcelo
(74) *Attorney, Agent, or Firm*—Global IP Counselors, LLP (57) ABSTRACT

The drag adjusting device is provided with a pin member 70 arranged on a plate-like member 80 of a reel unit 1 such that it can be attached to and detached and such that its position can be changed. The pin member 70 serves to remember a prescribed pivot position of a drag mechanism operating member 2. When an angler finds an optimum drag lever position, the angler installs the pin member 70 in a mounting recess 81 corresponding to the optimum drag lever position. In this way, the angler can easily set the drag mechanism operating member 2 to the optimum drag lever position without having to remember the drag lever position.

18 Claims, 8 Drawing Sheets

DRAG ADJUSTING DEVICE FOR DUAL-BEARING REEL

CROSS-REFERENCE TO RELATED APPLICATIONS

This application claims priority under 35 U.S.C. §119 to Japanese Patent Application No. 2008-260238 filed on Oct. 7, 2008. The entire disclosure of Japanese Patent Application No. 2008-260238 is hereby incorporated herein by reference.

BACKGROUND OF THE INVENTION

1. Field of the Invention

The present invention relates to a drag adjusting device, particularly a drag adjusting device for a dual-bearing reel constructed to adjust a drag force of a drag mechanism serving to brake a spool that is rotatably mounted to a reel unit of the dual-bearing reel.

2. Background Information

Japanese Laid-open Patent Publication No. 2004-173592 discloses lever drag reel constructed such that a drag force can be adjusted by using a drag mechanism operating member to move a spool shaft in an axial direction, the drag mechanism operating member being mounted such that it can pivot about a spool shaft of the spool. This type of lever drag reel typically has a level indicating section serving to indicate a level of the braking force with numerals from 0 to 9. The current braking force level can be ascertained by observing which numeral of the level indicating section is pointed to by a pointer part provided on a drag lever. With this kind of lever drag reel, the current braking force can be recognized by pivoting the drag lever to a position where the pointer part points to a particular position (e.g., a "3-position") of the level indicating section.

SUMMARY OF THE INVENTION

With the conventional drag adjusting device described herein above, the drag lever can be stopped at any position between a 0-position and a 9-position of the level indicating section. More specifically, the drag lever can be stopped at a position between the 3-position and a 4-position. When an angler finds an optimum drag lever position through trial and error while fighting with fish, the angler can remember the drag lever position and adjust the drag lever to the same optimum position the next time the reel is used.

However, it has been discovered that since the drag lever can be stopped at any position, it is possible for the optimum drag lever position to be at a position where the pointer part does not align precisely with one of the numerals of the level indicating section, e.g., a position located between the 3-position and the 4-position and closer to the 4-position. In such a case, it is very difficult for the angler to remember the optimum drag lever position and also difficult to stop the drag lever at the optimum drag lever position quickly.

Accordingly, aspects of the present invention have been created to solve the above-mentioned problems occurring in the conventional practice, and to provide a drag adjusting device for a dual-bearing reel that enables an angler to easily recognize an optimum drag lever position.

According to one aspect of the present invention, a drag adjusting device for a dual-bearing reel is provided to adjust a drag force of a drag mechanism serving to brake a spool that is rotatably mounted to a reel unit of the dual-bearing reel The drag adjusting device comprises a drag operating member pivotally attached to an outer surface of the reel unit such that the drag operating member can pivot about a spool shaft of the spool between a minimum position corresponding to a minimum drag force of the drag mechanism and a maximum position corresponding to a maximum drag force of the drag mechanism, and a drag memory part removably coupled to an outer side surface of the reel unit so as to be repositioned within a pivot range of the drag operating member between the minimum position and the maximum position, the drag memory part being configured to remember a prescribed pivot position of the drag operating member.

According to another aspect of the drag adjusting device, the reel unit includes a plurality of mounting recesses arranged side by side on the outer side surface of the reel unit and along the pivot direction of the drag operating member between the minimum position and the maximum position of the drag mechanism.

According to another aspect of the drag adjusting device, the drag memory part is a pin member configured to be mounted in one of the plurality of mounting recesses.

According to another aspect of the drag adjusting device, each of the plurality of mounting recesses has a through-hole that passes through a member coupled to the outer side surface of the reel unit.

According to another aspect of the drag adjusting device, the reel unit includes a side cover with the plurality of mounting recesses arranged along the outer perimeter of the side cover.

According to another aspect of the drag adjusting device, the reel unit includes a side cover and a plate member attached to an outer side surface of the side cover. The plurality of mounting recesses is arranged along the outer perimeter of the plate member.

According to another aspect of the drag adjusting device, the drag operating member has an aperture such that the drag memory part can be visually recognized when the drag memory part is mounted in one of the through-holes.

According to another aspect of the drag adjusting device, the pin member is constructed to be press-fitted into one of the plurality of mounting recess.

According to another aspect of the drag adjusting device, the pin member is constructed to be screwed into one of the plurality of mounting recess.

According to another aspect of the drag adjusting device, the pin member is colored differently than the reel unit.

According to another aspect of the drag adjusting device also includes a first braking member movably mounted to an end portion of the spool, and a second braking member mounted adjacent to the first braking member. The second braking member is fixed in the axial direction and prevented from rotating in a line reel-out direction of the spool. A variable braking force is applied to the spool when the drag operating member is pivoted, causing the first braking member to move into friction-contact with the second braking member.

These features, aspects and advantages of the present invention will become apparent to those skilled in the art from the following detailed description, which, taken in conjunction with the annexed drawings, disclose embodiments of the present invention.

BRIEF DESCRIPTIONS OF THE DRAWINGS

Referring now to the attached drawings which form a part of this original disclosure.

DETAILED DESCRIPTION OF THE EMBODIMENT

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
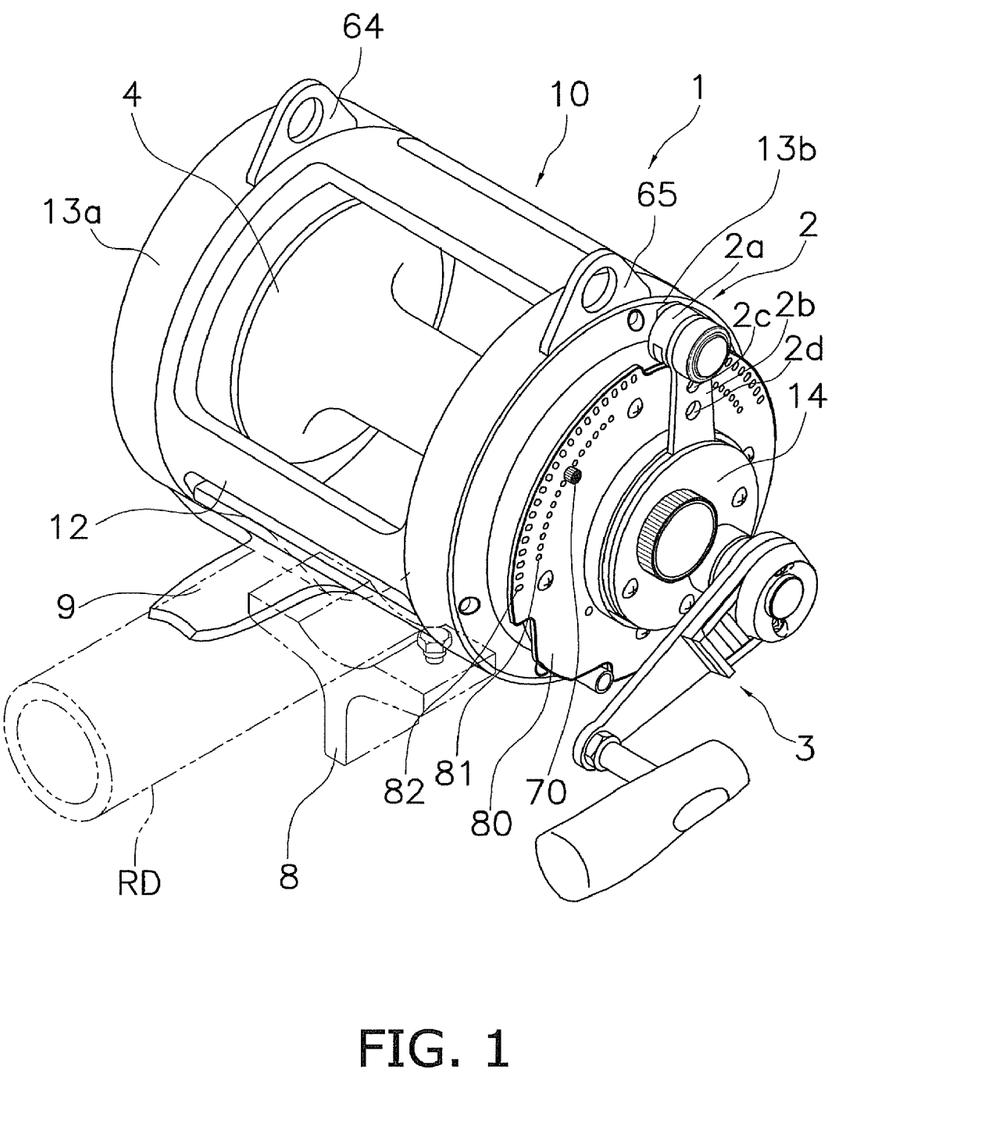
FIG. 1 is a perspective view of a dual-bearing reel in which an embodiment of the present invention is employed.
Figure 2:
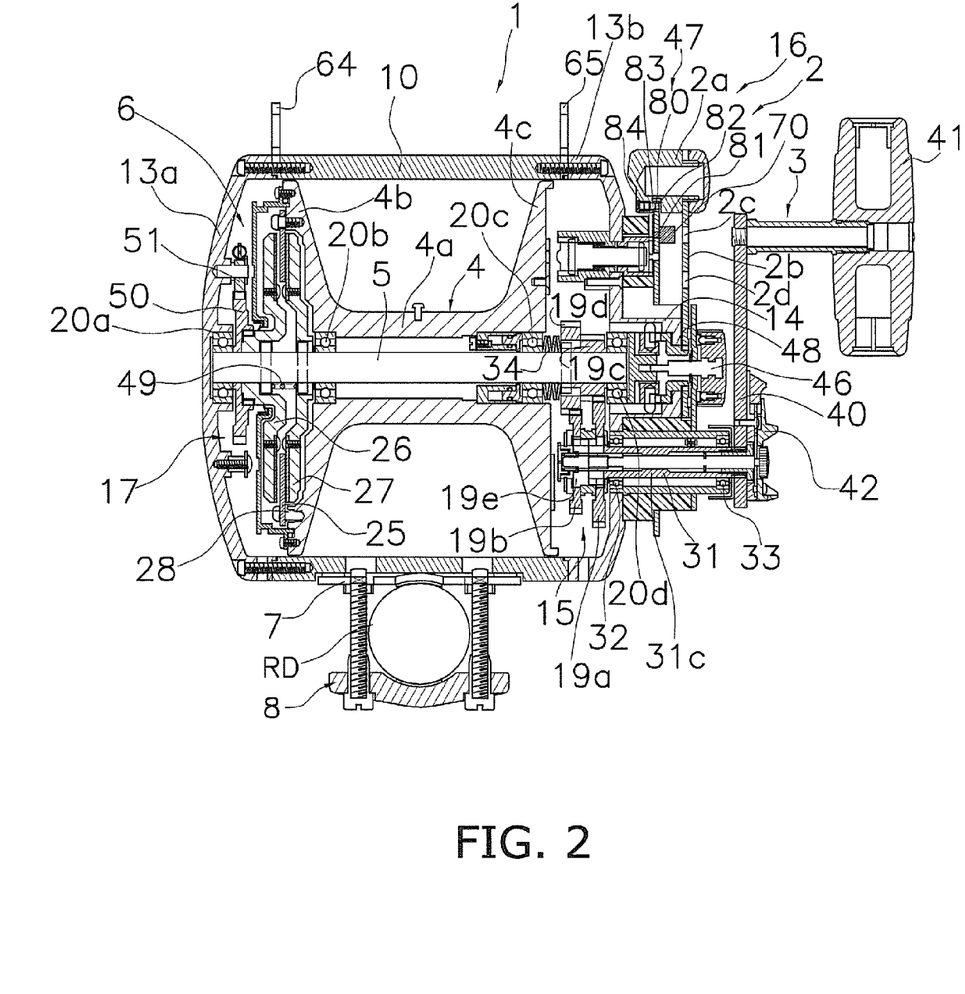
FIG. 2 is a cross sectional view of the same dual-bearing reel.

Referring initially to FIGS. 1 and 2, a lever drag type dual-bearing reel for trolling is illustrated in accordance with one embodiment of the present invention. The dual-bearing reel has a cylindrical reel unit 1, a spool shaft 5 rotatably mounted in a center portion of the reel unit 1, a spool 4 supported on the spool shaft 5 such that it can rotate freely but cannot move in an axial direction, and a handle 3 arranged on a side of the reel unit 1. The dual-bearing reel also has a rotation transmission mechanism 15 constructed to transmit rotation of the handle 3 to the spool 4, a drag mechanism 6 constructed to brake rotation of the spool 4 in a line reel-out direction, a drag adjusting mechanism 16 constructed to adjust a drag force of the drag mechanism 6, and a reverse rotation preventing mechanism 17 constructed to restrict rotation of the spool in the line reel-out direction—all arranged inside the reel unit 1.

The reel unit 1 has a left-hand first side cover 13a and a right-hand second side cover 13b, each of which is dish-shaped and made of metal, and a frame 10 arranged and configured such that both ends thereof are covered by the first side cover 13a and the second side cover 13b. The frame 10 is a metal cylindrical member with holes formed therein and is fixed in place with a plurality of screws. The first side cover 13a and the second side cover 13b are connected concentrically onto both ends of the frame socket joints.

Figure 3:
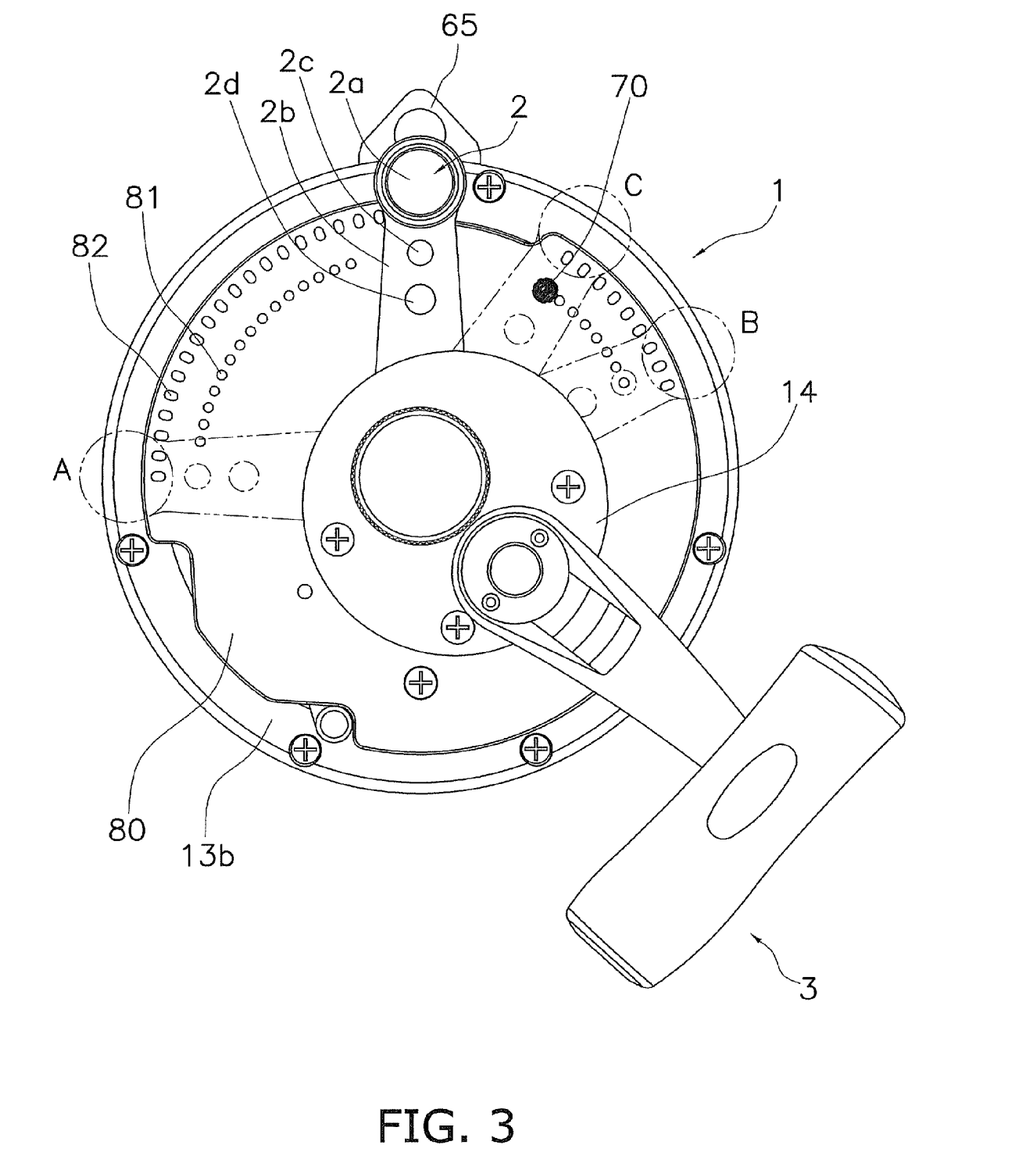
FIG. 3 is a side view of the same dual-bearing reel.
Figure 4:
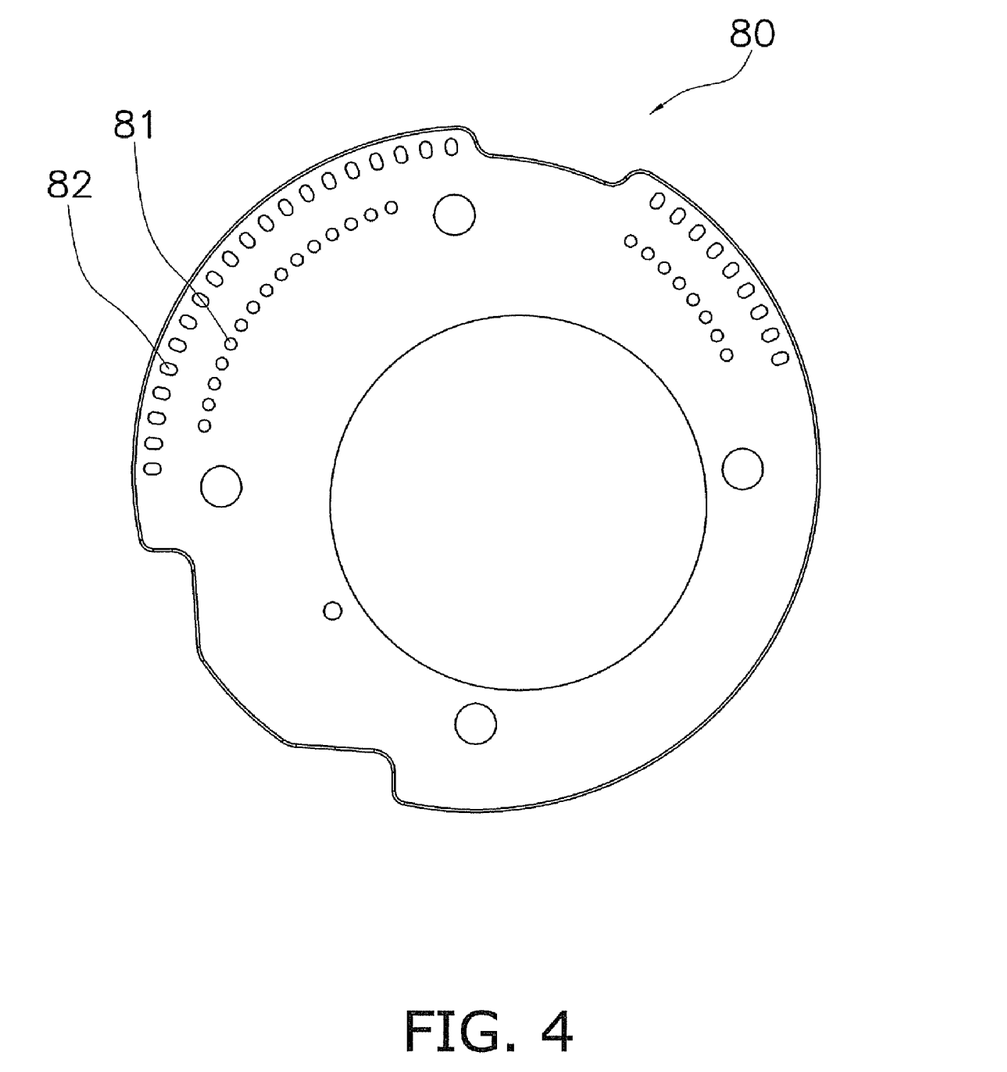
FIG. 4 is an enlarged side view of a plate-like member.

Referring again to FIG. 1, and now to FIGS. 3, and 4, a circular disk-shaped plate-like member 80 is screw fastened to an outward side of the second side cover 13b. The plate-like member 80 is made of an aluminum alloy. A through hole configured to allow a cylindrical portion 14 to pass through is formed in a center portion of the plate-like member 80, and a cut-away portion is provided in an upper portion of the plate-like member 80. A plurality of mounting recesses 81 configured for a pin member 70 (described later) to be mounted therein are provided in an outside portion of a side portion of the plate-like member 80 and arranged side by side along a pivot direction of the drag mechanism operating member 2 within a pivot range of the drag mechanism operating member 2. A plurality of sound generating recesses 82 of a drag adjustment sound generating mechanism 47 (described later) are formed in the side portion of the plate-like member 80 in positions located radially outward from the mounting recesses 81. The center positions of the sound generating recesses 82 are aligned at the same phase angles as the center positions of the mounting recesses 81 along the pivot direction and serve to generate a sound when the drag mechanism operating member 2 is pivoted. An outer circumferential portion of the plate-like member 80 fits into a semicircular slit formed in a bottom surface of an operating part 2a (described later) of the drag mechanism operating member 2 and functions as a lever guide for supporting the drag mechanism operating member 2 in the pivot direction.

As shown in FIGS. 1, 3, and 4, each of the mounting recesses 81 is a through hole that is formed in a side portion of the plate-like member 80 and has a circular peripheral shape. The pin member 70 (exemplifying a drag memory part) is configured to be mounted in one of the mounting recesses 81 at a time. Each of the sound generating recesses 82 is a through hole that has an oval peripheral shape and serves as a sound generating recess for generating a sound in response to a pivot movement of the drag mechanism operating member 2. Since the sound generating recesses 82 are arranged such that the center positions thereof are arranged at the same phase angles as the center positions of the mounting recesses 81, an angler can set the drag mechanism operating member 2 to a drag lever position corresponding to the position of the pin member 70 (described later) more accurately by simply pivoting the drag mechanism operating member 2 in accordance with the sound or clicking feeling generated by the sound generating mechanism 47.

The first side cover 13a and the second side cover 13b are arranged to rotatably support both ends of the spool shaft 5 with approximately center portions thereof. As shown in FIGS. 2 and 3, a cylindrical portion 14 arranged to protrude outward along an axial direction is provided on the second side cover 13b (which is the side cover located on the handle 3 side of the reel) to support the spool shaft 5.

As shown in FIGS. 1 and 2, two harness lugs 64 and 65 for attaching to a reel harness are provided on an upper portion between the frame 10 and the first and second side covers 13a and 13b and arranged to be spaced apart from each other. A rod mounting leg 7 for mounting the reel to a fishing rod RD is provided on a lower portion of the frame 10. A rod clamp 8 is arranged opposite the rod mounting leg 7 such that the fishing rod RD is sandwiched in-between.

As shown in FIG. 2, the spool shaft 5 is rotatably supported in the first and second side covers 13a and 13b of the reel unit 1 with a left-right pair of bearings 20a and 20d arranged at both ends of the spool shaft 5. Meanwhile, the spool 4 is rotatably supported on two bearings 20b and 20c that are spaced apart from each other along an axial direction and arranged at both ends of the spool 4 between the bearings 20a and 20d. A component part of a moving mechanism 46 of the drag mechanism 6 is arranged to abut against a right side of an outer race of the right-end bearing 20d of the spool shaft 5, and a third gear 19c of a rotation transmission mechanism 15 is arranged abutted against a left side of an inner race of the bearing 20d. The reverse rotation preventing mechanism 17 is arranged abutted against a right side of an inner race of the left-end bearing 20a of the spool shaft 5. The first side cover 13a is arranged abutted against a right end of an outer race of the bearing 20d. A friction disk 27 of the drag mechanism 6 is arranged abutted against a left side of an inner race of the left bearing 20b supporting the spool 4, and the spool 4 abuts against the right side of the outer race of the left bearing 20b.

As shown in FIG. 2, the spool 4 has a line winding body portion 4a and first and second flange portions 4b and 4c that are integrally formed on opposite ends of the line winding by portion 4a. The spool 4 is rotatably supported on the spool shaft 5 with the bearings 20b and 20c.

As shown in FIG. 2, the handle 3 is fixed to a protruding end of a cylindrical handle 31 that is arranged below the spool shaft 5 so as to be parallel to the spool shaft 5. The handle shaft 31 is rotatably supported in the reel unit 1 with two bearings 32 and 33 that are arranged below the cylindrical portion 14 so as to be spaced apart in an axial direction. As shown in FIG. 2, the handle 3 has a handle arm 40 that is fixed to the distal end of the handle shaft 31 and a handle knob 41 that is rotatably supported on a distal end of the handle arm 40. The handle arm 40 is fastened to the distal end of the handle shaft 31 with a screw member 42 such that it cannot rotate relative to the handle shaft 31. In order to make it easier to grip and apply force to, the external shape of the handle knob 41 is formed to be rounded and generally T-shaped.

The rotation transmission mechanism 15 has a gear changing mechanism constructed such that it can switch between a high speed gear ratio and a low speed gear ratio. As shown in FIG. 2, the rotation transmission mechanism 15 includes a first gear 19a for high-speed reeling-in and a second gear 19b for low-speed reeling-in that are rotatably supported on the handle shaft 31 of the handle 3, a third gear 19c and a fourth gear 19d that are non-rotatably attached to the spool shaft 5 and arranged to mesh with the first gear 19a and the second gear 19b, respectively, and an engaging piece 19e that is configured and arranged to selectively couple either the first gear 19a or the second gear 19b to the handle shaft 31 such that rotation can be transmitted from the handle 3 to the spool shaft 5.

As shown in FIG. 2, the drag mechanism 6 includes a brake disk 25 attached to a left end of the spool 4, a pair of friction disks 26 and 27 arranged on both sides (opposite sides) of the brake disk 25, and a coil spring 28 arranged to apply a spring load against the spool 4 in a direction of separating the brake disk 25 from the friction disk 27.

As shown in FIG. 2, the brake disk 25 is a circular disk-like member that is shaped like a washer and made of, for example, stainless steel. The brake disk 25 is attached to an end face of the first flange portion 4b (left side) of the spool 4 with a plurality of mounting pins that are arranged to be spaced apart from one another along a circumferential direction and configured such that the brake disk 25 can move freely toward and away from the spool 4 with in a prescribed distance but cannot rotate with respect to the spool 4.

As shown in FIG. 2, the friction disk 26 is arranged facing a surface of the brake disk 25 that faces in a direction opposite the direction of (i.e., away from) the spool 4. The surface of the friction disk 26 that faces the brake disk 25 has a ring-shaped friction plate fastened thereto with small screws or another suitable fastening means. The friction plate is made of carbon graphite, fiber reinforced resin, or another wear resistant material. The friction disk 26 has a cylindrical boss arranged in a center portion thereof and a pin is passed through the boss in a radial direction of the spool shaft 5 and mounted into the spool shaft 5. In this way, the friction disk 26 is mounted non-rotatably to the spool shaft 5 such that it rotates together with the spool shaft 5. A ratchet wheel 50 of the reverse rotation preventing mechanism 17 is arranged abutting against a left end face of the boss of the friction disk 26. The ratchet wheel 50 is attached to an outer circumferential surface of the boss of the friction disk 26 and serrations or another suitable configuration is employed to prevent the ratchet wheel 50 from rotating relative to the boss. The ratchet wheel 50 abuts against the inner race of the bearing 20a, and the outer race of the bearing 20a abuts against the first side cover 13a. As a result, the friction disk 26 cannot move outward along an axial direction of the spool shaft 5, i.e., in a direction of separating from the brake disk 25 and rotation of the friction disk 26 in the line reel-out direction is prohibited by the ratchet wheel 50.

The reverse rotation preventing mechanism 17 is a pawl mechanism comprising the ratchet wheel 50, which has saw tooth-like ratchet teeth formed on an outer circumferential surface thereof, and a ratchet pawl 51 that is arranged in a radially outward direction from the outer circumferential surface of the ratchet wheel 50 such that a distal end thereof engages with the ratchet teeth. The ratchet pawl 51 is pivotally mounted on an inside surface of the first side cover 13a and spring loaded with a tensile spring in a direction of engaging with the ratchet teeth.

As shown in FIG. 2, the friction disk 27 is arranged facing a surface of the brake disk 25 that faces toward the spool 4 and the friction disk 27 is mounted to the spool shaft 5 such that it rotates together with the friction disk 26 and can move freely toward and away from the friction disk 26 along an axial direction of the spool shaft 5. A ring-shaped friction plate made of carbon graphite, fiber reinforced resin, or another wear resistant material is fastened with screws to a surface of the friction disk 27 that faces the brake disk 25. The friction disk 27 is non-rotatably mounted to the spool shaft 5 at a center portion thereof with a pin that is passed through the friction disk 27 in a radial direction of the spool shaft 5 and mounted into the spool shaft 5. A washer is arranged sandwiched between the right end face of the friction disk 27 and the inner race of the bearing 20b. As a result, the friction disk 27 is pushed by the spool 4 through the bearing 20b and also pushes the spool 4.

As shown in FIGS. 1 to 3, the drag adjusting mechanism 16 comprises chiefly the drag mechanism operating member 2 arranged on the reel unit 1 such that it can pivot freely about the spool shaft 5, a moving mechanism 46 constructed to move the spool 4 in an axial direction relative to the spool shaft 5 in response to a pivot movement of the drag mechanism operating member 2, and the drag adjustment sound generating mechanism 47 constructed to generate a sound in response to a pivot movement of the drag mechanism operating member 2. The moving mechanism 46 has a pushing mechanism 48 constructed to push and move the spool 4 and the friction disk 27 leftward when the drag mechanism operating member 2 is pivoted clockwise from the perspective of FIG. 3 and a return spring 49 arranged to spring load the friction disk 27 such that the spool 4 and the friction disk 27 move rightward when the drag mechanism operating member 2 is pivoted counterclockwise from the perspective of FIG. 3. The drag adjustment sound generating mechanism 47 comprises a plurality of sound generating recesses 82 arranged in the plate-like member 80 so as to face the drag mechanism operating member 2 and to extend from a free position to a maximum position along a pivot direction of the drag mechanism operating member 2 with spaces in-between, a sound generating pin 83 attached to the drag mechanism operating member 2 such that it can move reciprocally toward and away from the sound generating recesses 82, and a coil spring 84 arranged to spring load the sound generating pin 83 toward the sound generating recesses 82. The sound generating recesses 82 comprise a portion ranging from the free position to a strike position and a portion having an open interval in the pivot direction between the maximum position and a position preceding the maximum position.

As shown in FIGS. 1 and 3, the drag mechanism operating member 2 is a lever-like member pivotally attached to an outside portion of the reel unit 1 such that it can pivot freely about the spool shaft 5 of the spool 4 between a free position (position A in FIG. 3) corresponding to a drag free state in which the spool 4 can rotate freely and a maximum position (position B in FIG. 3) corresponding to a maximum drag state of the drag mechanism 6. As shown in FIGS. 1 and 3, the drag mechanism operating member 2 has an operating section 2a arranged above for an angler to operate manually and a plate-like section 2b arranged below. The plate-like portion 2b has a viewing opening 2c that passes through an upper portion of the plate-like portion 2b and serves to enable a user to view the pin member 70 installed in a mounting recess 81 and a decorative opening 2d that passes through a lower portion of the plate-like portion 2b.

The viewing opening 2c is a circular through hole whose center is positioned at a radial distance from a pivot center of the drag mechanism operating member 2 that is the same as the radial distance from the pivot center of the drag mechanism operating member 2 to a semicircular arc along which the mounting recesses 81 are arranged. The peripheral shape of the viewing opening 2c is generally the same as the circular peripheral shape of the pin member 70. The decorative opening 2d is provided to improve the external appearance of the drag mechanism operating member 2, and is located on the underside of the viewing opening 2c, and is a circular through hole having a slightly larger diameter than the viewing opening 2c.

Figure 5:
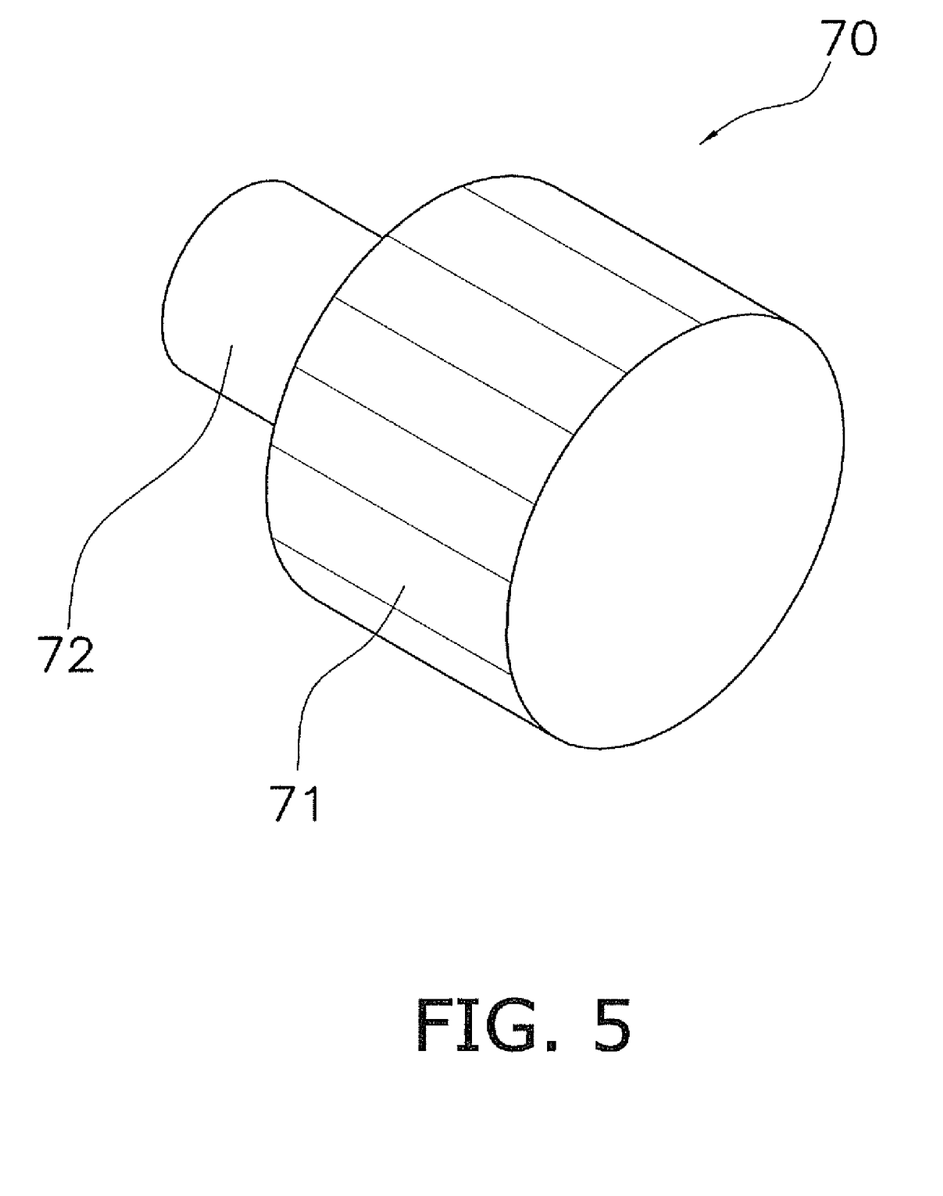
FIG. 5 is an enlarged perspective view of a pin member.

Referring again to FIGS. 1 and 3, and now to FIG. 5, the pin member 70 is detachably and position-changeably arranged on the plate-like member 80 of the reel unit 1. More specifically, the pin member 70 is configured to be mounted in any one of the mounting recesses 81 in order to remember a prescribed pivot position of the drag mechanism operating member 2. For example, when an optimum position of the drag mechanism operating member 2 is found (e.g., the position C shown in FIG. 3), the pin member 70 is pressed into the mounting recess 81 that is visible through the viewing opening 2c. The pin member 70 is made of a synthetic resin and a surface thereof has been colored red, orange, or another comparatively conspicuous color that is different from the color of the reel unit 1. As shown in FIG. 5, the pin member 70 has a larger diameter section 71 configured to be grasped by an angler when removing or installing the pin member 70 and a smaller diameter section 72 configured to be inserted into a mounting recess 81. The larger diameter section 71 has a plurality of grooves extending along an insertion and removal direction to enable an angler to grasp it more easily. An external diameter of the smaller diameter section 72 is slightly larger than an internal diameter of the mounting recesses 81 such that the synthetic resin smaller diameter section 72 can be snugly pressed into any of the aluminum alloy mounting recesses 81. The pin member 70 is configured such that when it is mounted in one of the mounting recesses 81, a gap exists between the pin member 70 and the drag mechanism operating member 2 such that the pin member 70 does not contact the drag mechanism operating member 2 and, thus, does not hinder the pivot motion of the drag mechanism operating member 2.

This dual-bearing reel is provided with a pin member 70 arranged on the plate-like member 80 of the reel unit 1 such that it can be attached to and detached and such that its position can be changed. The pin member 70 serves to remember a prescribed pivot position of the drag mechanism operating member 2. When an angler finds an optimum drag lever position (e.g., the position C shown in FIG. 3), the angler installs the pin member 70 in the mounting recess 81 corresponding to the optimum drag lever position. Then, an angler can easily set the drag mechanism operating member 2 to the optimum drag lever position by simply pivoting the drag mechanism operating member 2 to a position (position C in FIG. 3) where the pin member 70 can be viewed through the viewing opening 2c. As a result, the angler does not have to remember the drag lever position, as is required with conventional dual-bearing reels.

Other Example Embodiments (a) Although in the previously described embodiment present invention is employed in a medium sized reel for trolling, the present invention is not limited to such an application and can employed in any dual-bearing reel having a lever-type drag adjusting mechanism.

Figure 6:
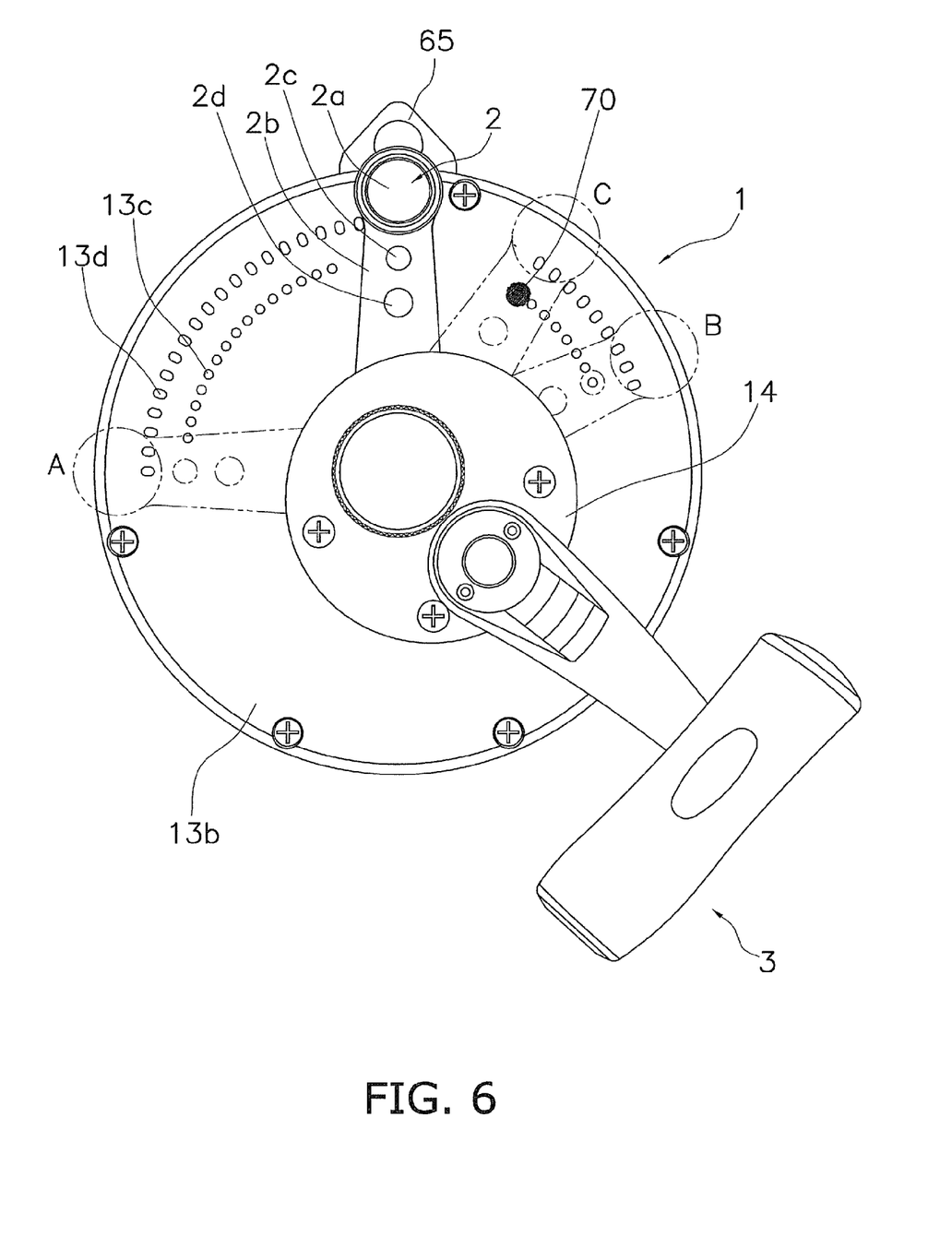
FIG. 6 is a side view of another embodiment and is equivalent to FIG. 3.

(b) Although in the previously described embodiment mounting recesses 81 are provided as through holes formed in the plate-like member 80, it is also acceptable to provide mounting recesses 13c as through holes formed in the second cover 13b. Additionally, as shown in FIG. 6, decorative holes 13d can be provided to function in a manner corresponding to the sound generating recesses 82. The mounting recesses 81 and the mounting recesses 13c are not limited to being formed as through holes; it is acceptable for them to be formed as bottomed recesses so as to open at an outward surface of the plate-like member 80 or the second side cover 13b.

Figure 7:
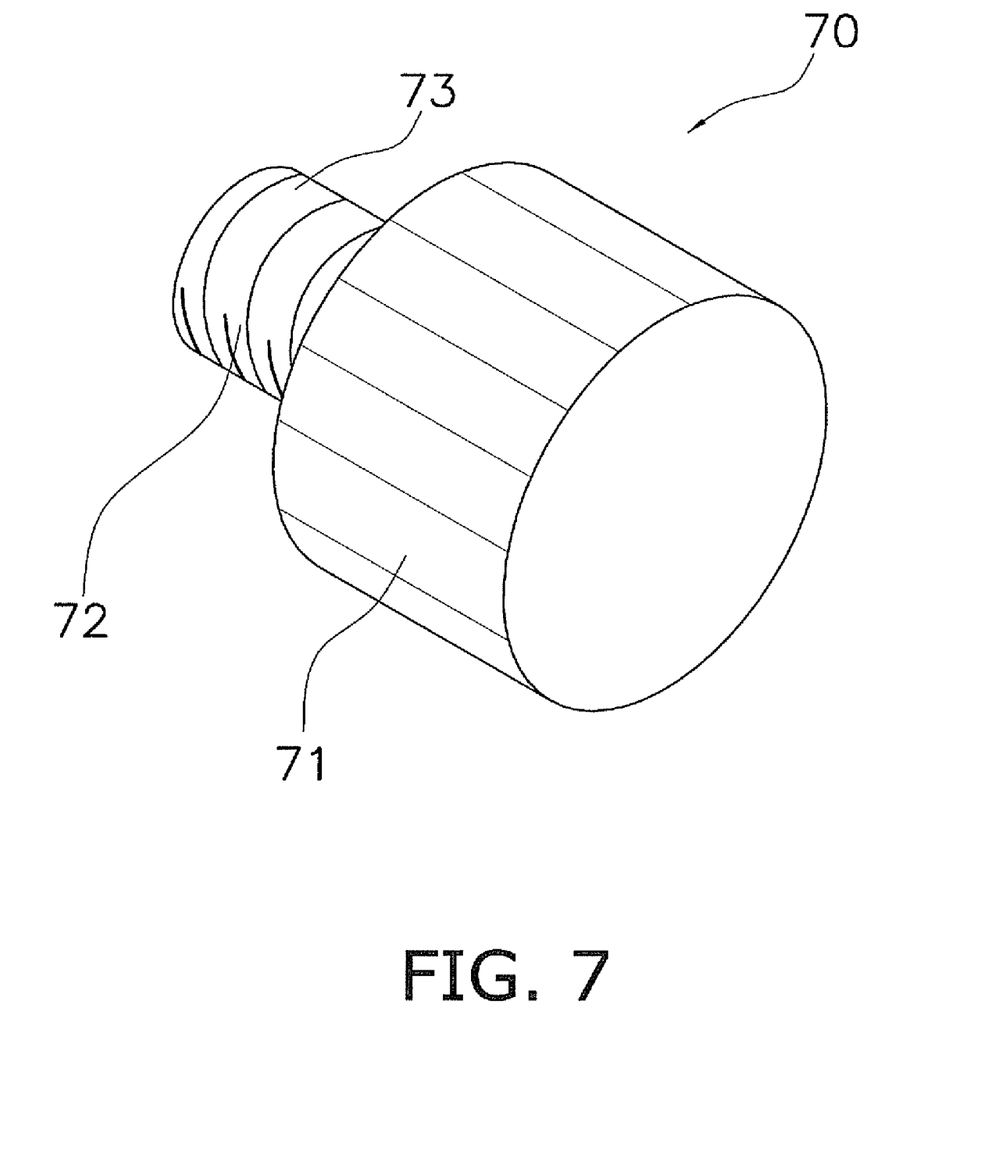
FIG. 7 is an enlarged perspective view of another embodiment and is equivalent to FIG. 5.

(c) Although in the previously described embodiment the pin member 70 is configured to be mounted in any of the mounting recesses 81 of the plate-like member 80 by being pressed in, it is also acceptable for the smaller diameter section 72 of the pin member 70 to have an externally threaded portion 73 configured to screw into an internally threaded portion (not shown in the drawings) of each of the mounting recesses 81 of the plate-like member 80.

(d) Although in the previously described embodiment the pin member 70 is a member made of a synthetic resin and having a different color than the plate-like member 80, there are no particular limitations on the material and color of the pin member 70 and it is acceptable for the pin member 70 to be, for example, a metal member having a different color than the plate-like member 80.

Figure 8:
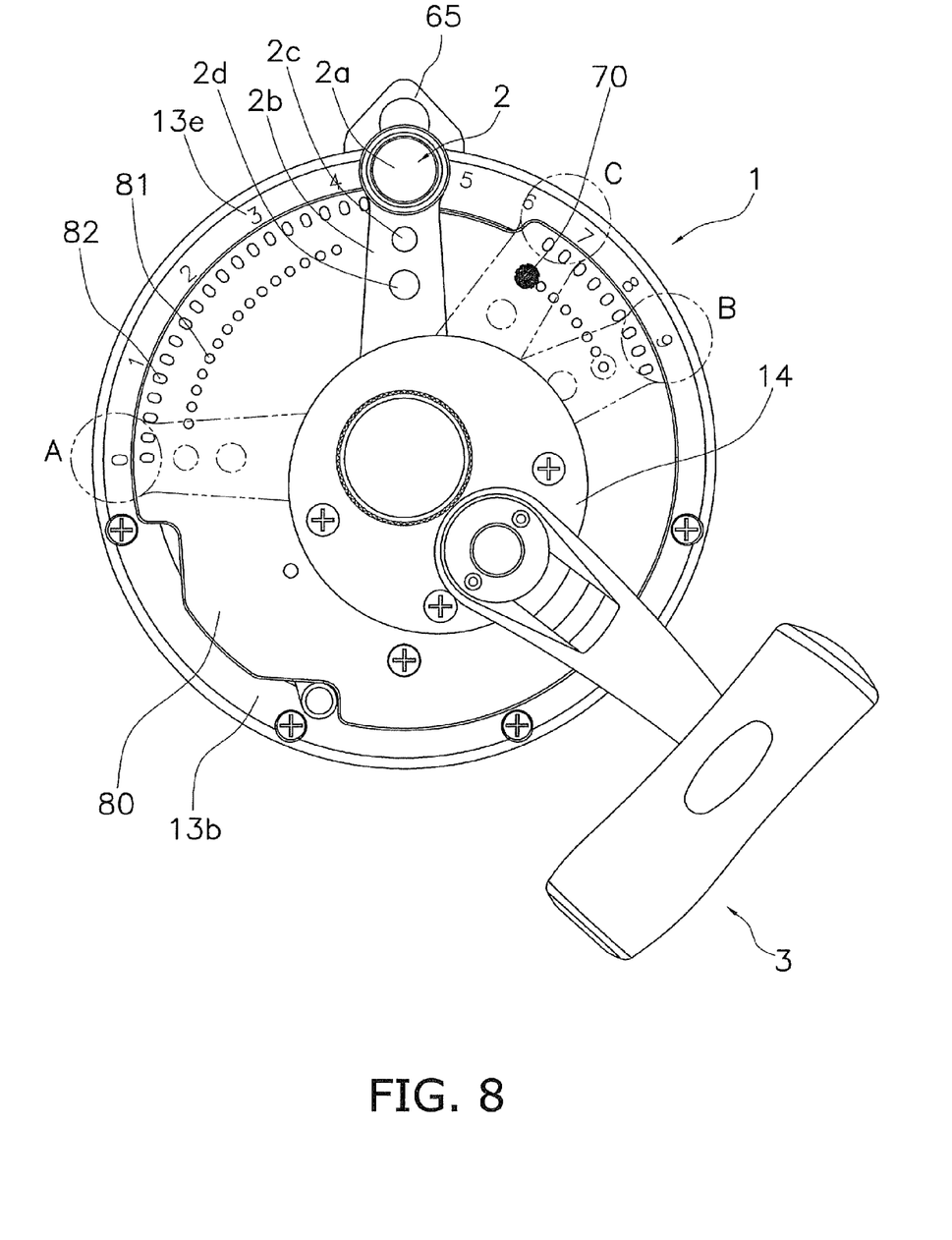
FIG. 8 is a side view of another embodiment and is equivalent to FIG. 3.

(e) As shown in FIG. 8, it is acceptable to provide a level indicating section 13e that indicates the braking force level with numerals from 0 to 9 arranged along an outer portion located radially to the outside of the mounting recesses within a pivot range of the drag mechanism operating member 2. FIG. 8 depicts the pin member 70 mounted in a position between a 6-position and a 7-position. Although not depicted in the figure, it is also acceptable for the drag mechanism operating member 2 to be provided with a pointer part configured to point to a numeral on the level indicating section 13e.

EFFECTS OF THE INVENTION

A drag adjusting device for a dual-bearing reel according to the present invention is provided with a drag memory part for remembering a prescribed pivot position of a drag mechanism operating member, the drag memory part being detachably and position-changeably arranged on a reel unit of the dual-bearing reel. As a result, an optimum drag lever position can be ascertained readily.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applied to words having similar meanings such as the terms, "including," "having," "with" and their derivatives. Also, the term "part," "section," "portion," "member," or "element" when used in the singular can have the dual meaning of a single part or a plurality of parts.

As used herein, the following directional terms "forward", "rearward", "above", "below", "downward", "upward", "vertical", "horizontal", "inner", "outer", "longitudinal" and "transverse" as well as any other similar directional terms refer to those directions of a device equipped with the present invention. Accordingly, these terms, as utilized to describe aspects of the present invention, should be interpreted relative to a device equipped with the present invention.

The term "configured" as used herein to describe a component, section or part of a device implies the exist of other unclaimed or unmentioned components, sections or parts of the device to carry out the desired function.

The terms of degree such as "substantially" or "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A drag adjusting device for a dual-bearing reel constructed to adjust a drag force of a drag mechanism serving to brake a spool rotatably mounted to a reel unit of the dual-bearing reel, comprising:
   a drag operating member pivotally attached to the reel unit such that the drag operating member can pivot about a spool shaft of the spool between a minimum position corresponding to a minimum drag force of the drag mechanism and a maximum position corresponding to a maximum drag force of the drag mechanism; and
   a drag memory part removably and selectively coupled to any of a plurality of mounting recesses of an outer side surface of the reel unit so as to be detached from one of the plurality of mounting recesses and mounted in another of the plurality of the mounting recesses different from the one of the plurality of mounting recesses within a pivot range of the drag operating member between the minimum position and the maximum position, the drag memory part being configured to mark a prescribed pivot position of the drag operating member, the drag memory part being removed from any of the recesses in a direction away from the reel unit.

2. The drag adjusting device for a dual-bearing reel recited in claim 1, wherein
   the mounting recesses are arranged side by side on the outer side surface of the reel unit and along the pivot direction of the drag operating member between the minimum position and the maximum position of the drag mechanism.

3. The drag adjusting device for a dual-bearing reel recited in claim 2, wherein
   the drag memory part is a pin member configured to be mounted in one of the plurality of mounting recesses.

4. The drag adjusting device for a dual-bearing reel recited in claim 3, wherein
   the pin member is constructed to be press-fitted into one of the plurality of mounting recesses.

5. The drag adjusting device for a dual-bearing reel recited in claim 3, wherein
   the pin member is colored differently from the reel unit.

6. The drag adjusting device for a dual-bearing reel recited in claim 2, wherein
   each of the plurality of mounting recesses has a through-hole that passes through a member coupled to the outer side surface of the reel unit.

7. The drag adjusting device for a dual-bearing reel recited in claim 6, wherein
   the drag operating member has an aperture such that the drag memory part can be visually recognized when the drag memory part is mounted in one of the through-holes.

8. The drag adjusting device for a dual-bearing reel recited in claim 2, wherein
   the reel unit further includes a side cover with the plurality of mounting recesses arranged along the outer perimeter of the side cover.

9. The drag adjusting device for a dual-bearing reel recited in claim 2, wherein
   the reel unit includes a side cover and a plate member attached to an outer side surface of the side cover, and the plurality of mounting recesses is arranged along the outer perimeter of the plate member.

10. The drag adjusting device for a dual-bearing reel recited in claim 2, further comprising
    a first braking member movably mounted to an end portion of the spool, and
    a second braking member mounted adjacent to the first braking member, the second braking member being fixed in the axial direction and prevented from rotating in a line reel-out direction of the spool, a variable braking force acting against the spool when the drag operating member is pivoted, causing the first braking member to move into friction-contact with the second braking member.

11. The drag adjusting device for a dual-bearing reel recited in claim 1, wherein
    the drag memory part has a first section and a second section, and
    the drag memory part is coupled to any of the recesses such that the first section extends in any of the recesses and the second section extends from the outer side surface in a direction away from the reel unit.

12. The drag adjusting device for a dual-bearing reel recited in claim 11, wherein
    the first section of the drag memory part has a diameter that is smaller than a diameter of the second section.

13. The drag adjusting device for a dual-bearing reel recited in claim 12, wherein
    the first section is made of a compressible material that compresses to fit into any of the plurality of recesses, and the diameter of the first section is larger than a diameter of any of the plurality of recesses when the drag memory part is removed.

14. A drag adjusting device for a dual-bearing reel constructed to adjust a drag force of a drag mechanism serving to brake a spool rotatably mounted to a reel unit of the dual-bearing reel, comprising:
    a drag operating member pivotally attached to an outer surface of the reel unit such that the drag operating member can pivot about a spool shaft of the spool between a minimum position corresponding to a minimum drag force of the drag mechanism and a maximum position corresponding to a maximum drag force of the drag mechanism; and a drag memory part removably coupled to an outer side surface of the reel unit so as to be repositioned within a pivot range of the drag operating member between the minimum position and the maximum position, the drag memory part being configured to mark a prescribed pivot position of the drag operating member, the pin member being constructed to be screwed into one of the plurality of mounting recesses.

15. A dual-bearing reel, comprising:

a reel unit having an outer side surface having a plurality of mounting recesses;

a spool shaft mounted in the reel unit;

a spool rotatably supported by the spool shaft in the reel unit;

a drag mechanism serving to brake the spool; and a drag adjusting device including a drag operating member pivotally attached to the reel unit, the drag operating member being able to pivot about the spool shaft between a minimum position corresponding to a minimum drag force of the drag mechanism and a maximum position corresponding to a maximum drag force of the drag mechanism, and a drag memory part removably coupled to any of the plurality of mounting recesses to mark a prescribed pivot position of the drag operating member, the drag memory part being detachable from one of the plurality of mounting recesses and mountable in another of the plurality of mounting recesses different from the one of the plurality of mounting recesses.

16. The dual-bearing reel recited in claim 15, wherein the drag memory part has a first section and a second section, the drag memory part is coupled to any of the recesses such that the first section extends in any of the recesses and the second section extends from the outer side surface in a direction away from the reel unit, and the drag memory part is removed from any of the recesses in the direction away from the reel unit.

17. The dual-bearing reel recited in claim 16, wherein the first section of the drag memory part has a diameter that is smaller than a diameter of the second section.

18. The dual-bearing reel recited in claim 17, wherein the first section is made of a compressible material that compresses to fit into any of the plurality of recesses, and the diameter of the first section is larger than a diameter of any of the plurality of recesses when the drag memory part is removed.

* * * * *